United States Patent [19]

Heyraud et al.

[11] 4,219,825
[45] * Aug. 26, 1980

[54] ELECTRIC ACTUATING DEVICE

[75] Inventors: Marc Heyraud, S-sur-Coffrane; André Martin, La Chaux-de-Fonds, both of Switzerland

[73] Assignee: Portescap, La Chaux-de-Fonds, Switzerland

[*] Notice: The portion of the term of this patent subsequent to Apr. 18, 1995, has been disclaimed.

[21] Appl. No.: 873,958

[22] Filed: Jan. 31, 1978

Related U.S. Application Data

[62] Division of Ser. No. 682,796, May 3, 1976, Pat. No. 4,084,502.

[30] Foreign Application Priority Data

May 2, 1975 [CH] Switzerland .......................... 5691/75

[51] Int. Cl.² ............................................. G01D 9/42
[52] U.S. Cl. .................................. 346/101; 101/93.29; 346/141; 335/272; 310/36
[58] Field of Search .................................. 346/101, 141; 101/93.29, 1 R; 335/272; 310/36

[56] References Cited

U.S. PATENT DOCUMENTS

| | | | |
|---|---|---|---|
| 3,138,427 | 6/1964 | Stein et al. | 335/282 X |
| 3,138,429 | 6/1964 | Cooley | 346/101 |
| 3,289,133 | 11/1966 | Bieger et al. | 335/272 X |
| 3,293,653 | 12/1966 | Amada | 346/101 |
| 3,479,626 | 11/1969 | Silverman et al. | 335/272 X |
| 3,486,148 | 12/1969 | Christensen | 335/272 |
| 3,501,726 | 3/1970 | Olesen | 335/272 |
| 3,757,348 | 9/1973 | Hoopes | 346/101 X |
| 3,970,979 | 7/1976 | Montagu | 310/36 X |
| 3,970,980 | 7/1976 | Nelson | 335/272 |
| 4,084,502 | 4/1978 | Heyraud et al. | 101/93.29 |

Primary Examiner—E. H. Eickholt
Attorney, Agent, or Firm—Cushman, Darby & Cushman

[57] ABSTRACT

A printing device for chronocomparators comprising a striker, an ironless cylindrical coil mounted for rotation in an air gap of a magnetic circuit and connected to the striker, the magnetic circuit being formed by a permanent magnet placed inside the coil and an outer part of magnetically permeable material surrounding the coil. The coil is connected through spiral springs to a source of electric control pulses. The spiral springs provide a return force for bringing the coil back to a rest position in the absence of a control pulse. A cylinder with a helical rib is placed to be stricken by the striker and a recording strip is inserted between the striker and the said cylinder.

5 Claims, 1 Drawing Figure

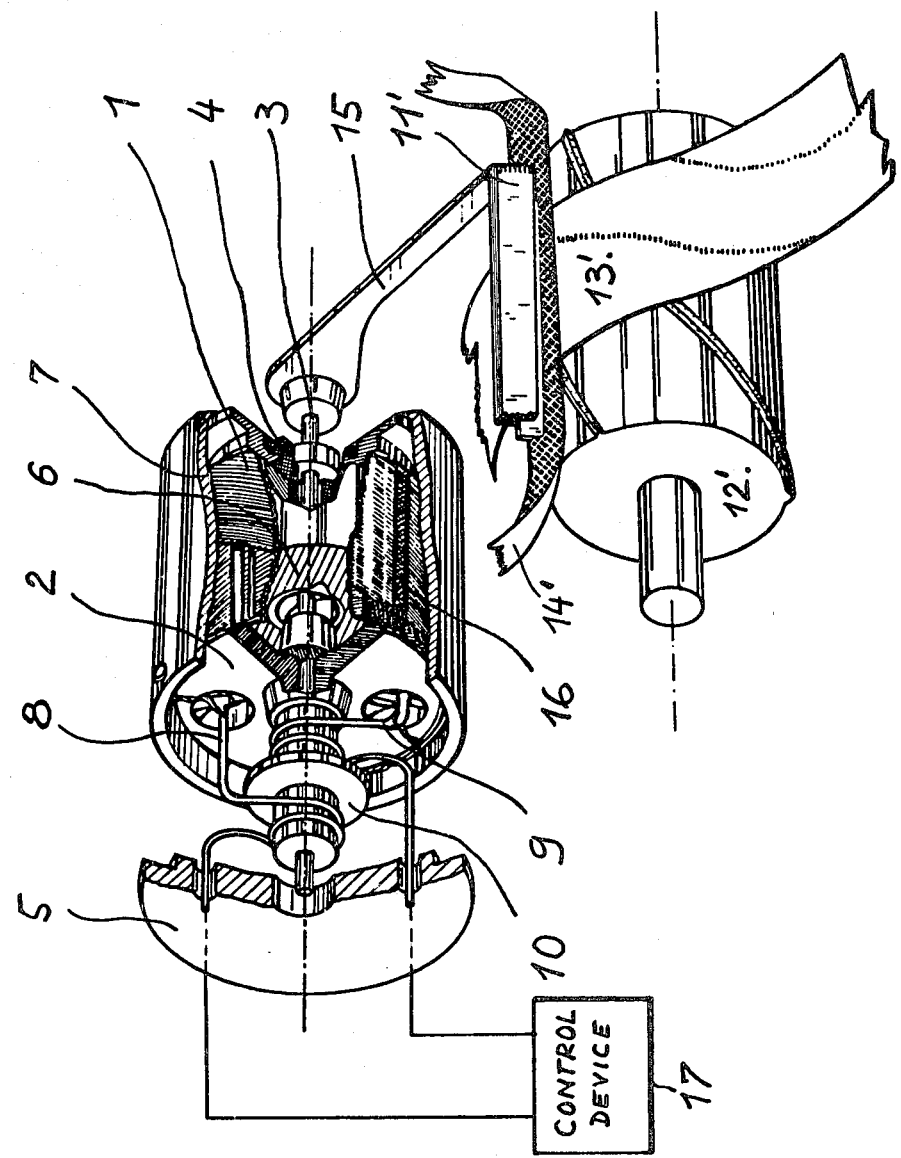

ELECTRIC ACTUATING DEVICE

The present application is a division of application Ser. No. 682,796, filed May 3, 1976 now U.S. Pat. No. 4,084,502.

BACKGROUND OF THE INVENTION

The present invention concerns a printing device more particularly for a chronocomparator, i.e. an apparatus for determining the instantaneous rate of a watch.

Known printing devices of this kind make use of an electromagnet for providing an angular movement and present therefore a number of disadvantages. In particular, the inductance of those devices is relatively important and this results in a high electric time constant. Furthermore, they have a poor ratio of torque to moment of inertia and of torque to volume of the printing device, so that they are not economically satisfactory and are limited in their performance.

OBJECTS AND SUMMARY OF THE INVENTION

The device according to the invention comprises a striker, an ironless coil mounted for rotation in the air gap of a magnetic circuit and electrically connected to a source of control pulses, the poles of the magnetic circuit and the coil being arranged for producing a torque upon occurrence of a control pulse, means for connecting the striker to the coil, means for providing a return torque for bringing the coil back to a rest position in the absence of a control pulse, a cylinder with a helical rib placed to be stricken by the striker, and a recording strip inserted between the striker and the said cylinder.

The coil can be of cylindrical shape and preferably comprises a self supporting winding mounted on one end thereof on a supporting disk. The magnetic circuit comprises preferably a permanent magnet placed inside the coil with the direction of its flux perpendicular to the axis of the coil and further comprises a cylindric part of magnetically permeable material surrounding the coil.

The means for producing a return torque can be mechanical means in the form of return springs, magnetic means or a combination of mechanic and magnetic means.

BRIEF DESCRIPTION OF THE DRAWINGS

The present invention will be better understood with reference to the detailed description of an exemplary preferred embodiment thereof taken in conjunction with the accompanying drawing in which the sole FIGURE is a perspective view of the main parts of a printing device for a chronocomparator.

DETAILED DESCRIPTION

The printing device shown in the FIGURE comprises a rotatable coil being part of a cup-shaped rotor as used in dc-micromotors. The shown coil 1 of cylindrical shape is self supporting and fixed on one of its ends upon supporting disk 2, the latter being mounted on an axis 3. The ends of axis 3 are supported for rotation respectively in a stationary part 4 of the device and in a cover 5 of the housing thereof.

The magnetic circuit is that of a dc-micromotor of the type comprising a cup-shaped rotor as mentioned above. A permanent magnet 6 is placed inside of the coil with its direction of magnetization extending in the direction of a diameter of the coil, and an outer cylindrical part 7 of magnetically permeable material is surrounding the coil, the parts 6 and 7 defining an air gap in which coil 1 is mounted for rotation.

In usual dc-micromotors with continuously rotating rotor the ends of the winding are electrically connected to two corresponding bars of a collector. In the present device the same ends of the winding are connected to the ends of two spiral springs 8, 9 the said ends of the springs being fixed to the supporting disk 2. The other ends of springs 8 and 9 are fixed to the cover 5, the spiral parts of the springs surrounding axis 3 and being electrically insulated from each other and from the axis by means of an insulating member 10. The function of the spiral springs 8 and 9 is to provide an electrical connection between the coil and a source of driving pulses 17 and further to provide a return torque for bringing the coil back to its rest position after the end of a driving pulse.

A striker 11 cooperates in a well known manner with a printing cylinder 12, a strip of printing paper 13 and a colouring ribbon 14. The striker is connected to axis 3 by means of a lateral arm 15.

In operation, when an electric control pulse is applied to the coil over springs 8 and 9, a driving torque is produced which rotates coil 1 together with arm 15 until the striker contacts the printing cylinder. At the end of the driving pulse the return springs bring the whole movable system back to the rest position.

The return force can be produced through different kinds of springs, for instance concentric springs, laminated springs or straight spring bars, all these springs being arranged to act on an appropriate part of the movable system. To reach optimal conditions during the acceleration period for the striking as well as during the return to the rest position, the return force is preferably variable as a function of the angular position of the coil.

According to a preferred embodiment of the actuating device the return force is at least in part produced by magnetic means. To this effect the coil bears a thin bar of soft iron 16 extending parallely to the axis of the coil in a manner to cooperate with one of the poles of magnet 6. The position of bar 16 is preferably determined so as to provide a return force of sufficient value in the vicinity of the rest position thereby compensating the reduction of the force of the return springs in this region.

The use of a combination of mechanic and magnetic means allows the return force which is variable as a function of the angular position of the coil to be optimally adapted. The mechanical return means generally produce a return force increasing with the angle of rotation from the rest position while the magnetic return means produce a return force decreasing in the same direction. The combination of both means therefore provides the possibility to define and to adjust the course of the variation of the return force in a very simple manner.

The FIGURE shows the printing cylinder 12 being provided with a helical rib as generally used in chronocomparators. The cylinder 12 is rotating with constant speed and produces the registration of a point on the strip 13 at each operation of the striker 11. It is to be noted that the acceleration of the striker is even greater than that of the coil as the striker moves on a larger radius than the coil and its mass is relatively small with respect to the entire mass of the movable system. The actuating device can be placed on the side of the printing cylinder 12 as it is desired from a constructional point of view. This also allows a direct instantaneous reading of the printed points thanks to the fact that the surface of strip 13 covered by the striker is reduced to a minimum.

With respect to the known printing devices with moving magnets the device according to the invention has the following important advantages:

The inductance is smaller and therefore the electric time constant shorter, generally by at least one order of magnitude than in the known devices.

The electric power required for the operation of the device is smaller, a feature which is particularly important due to the fact that generally electronic control devices are used with the printer.

The ratio torque/moment of inertia and torque/volume is considerably increased. Therefore, when a printing device of given performance is required a more economic control device can be used or, when the output of the control device is given the printing device reaches much higher performance.

It is further to be noted that the actuating device according to the invention allows the use of elements of already existing dc-micromotors with ironless rotor. This leads to a reduction of the manufacturing costs, as the corresponding parts can be produced in larger series.

While an exemplary embodiment of a printing device in accordance with this invention has been particularly described, it should be apparent to those skilled in this art, that various substitutions and modifications may be made to this embodiment without departing from the true spirit and scope of this invention.

We claim:

1. A printing device for a chronocomparator, comprising a striker, an ironless coil mounted for rotation in the air gap of a magnetic circuit and electrically connected to a source of control pulses, said coil being part of a cup shaped rotor and comprising a self supporting cylindrical winding fixed at its one end onto a supporting disk, said magnetic circuit comprising a permanent magnet placed inside the coil and a soft iron cylindric outer part surrounding the coil, the poles of the magnetic circuit and the coil being arranged for producing a torque upon occurrence of a control pulse, means for connecting the striker to the coil, means for providing a return torque for bringing the coil back to a rest position in the absence of a control pulse, said means for providing a return torque including two return springs electrically connected between the ends of the coil and the source of control pulses, a cylinder with a helical rib placed to be stricken by the striker, and a recording strip inserted between the striker and the said cylinder.

2. A device in accordance with claim 1 wherein the two return springs are spiral springs surrounding the axis of the coil and are separated from each other by an insulating member.

3. A printing device for a chronocomparator, comprising a striker, an ironless coil mounted for rotation in the air gap of a magnetic circuit and electrically connected to a source of control pulses, the poles of the magnetic circuit and the coil being arranged for producing a torque upon occurrence of a control pulse, means for connecting the striker to the coil, magnetic return means for producing a return torque acting on the coil for bringing the same back into a rest position in the absence of a control pulse, said magnetic return means comprising a member of magnetically permeable material associated with the rotor for rotation therewith, at least a part of said member being arranged in eccentric relationship with the rotor axis, a cylinder with a helical rib placed to be stricken by the striker, and a recording strip inserted between the striker and the said cylinder.

4. A device in accordance with claim 3 which further includes two return springs electrically connected between the ends of the coil and the source of control pulses, said return springs cooperating with said magnetic return means for bringing said coil back into a rest position.

5. A printing device for a chronocomparator, comprising a striker, an ironless coil mounted for rotation in the air gap of a magnetic circuit and electrically connected to a source of control pulses, the poles of the magnetic circuit and the coil being arranged for producing a torque upon occurrence of a control pulse, means for connecting the striker to the coil, means for providing a return torque for bringing the coil back to a rest position in the absence of a control pulse, a cylinder with a helical rib placed to be stricken by the striker, a recording strip inserted between the striker and the said cylinder, and wherein said means for providing a return torque include at least one bar of magnetically permeable material, the said bar being arranged on the surface of the coil parallely to the axis thereof and for rotation therewith.

* * * * *